United States Patent [19]
Hayes

[11] 3,791,761
[45] Feb. 12, 1974

[54] THRUST ADJUSTING MECHANISM FOR HYDRAULIC TURBINE WICKET GATES

[75] Inventor: Gerald L. Hayes, York, Pa.

[73] Assignee: Allis-Chalmers Corporation, Milwaukee, Wis.

[22] Filed: Sept. 29, 1972

[21] Appl. No.: 293,543

[52] U.S. Cl.............. 415/163, 415/500, 415/219 C
[51] Int. Cl............................................. F01d 9/00
[58] Field of Search... 415/160, 161, 162, 163, 164, 415/165, 500

[56] References Cited
UNITED STATES PATENTS
2,291,110   7/1942   Sharp................................. 415/163

FOREIGN PATENTS OR APPLICATIONS
792,040   8/1968   Canada.............................. 415/163

Primary Examiner—Henry F. Raduazo
Attorney, Agent, or Firm—John P. Hines

[57] ABSTRACT

Means are provided for limiting the axial thrust of the turbine wicket gates. A plate adjustably connected to the turbine headcover is selectively positioned relative to a shoulder on the wicket gate shaft to provide the proper thrust clearance.

1 Claim, 2 Drawing Figures

PATENTED FEB 12 1974

3,791,761

THRUST ADJUSTING MECHANISM FOR HYDRAULIC TURBINE WICKET GATES

This invention pertains in general to hydraulic turbine wicket gates and more particularly to a mechanism for adjusting the thrust clearance of the wicket gate.

In many types of hydraulic turbines wicket gates are provided about the turbine runner to control the water passing through the runner. Because of the large volumes of water which are controlled by the wicket gates, considerable axial thrust is imposed on the gates. In the past a machined surface on the wicket gate mated with a machined surface on the headcover to provide the proper thrust clearance. If later adjustment was necessary, the wicket gates had to be disassembled and either further machined, or shims were required to adjust the thrust clearance.

It is, therefore, the intention and general object of this invention to provide a thrust adjusting mechanism for hydraulic turbine wicket gates which permits more simplified adjustment of the thrust clearance than was possible with previously known structures.

A further object of the subject invention is to provide a thrust adjusting mechanism which includes a plate adjustably connected to the headcover which can be adjusted relative to a surface on the wicket gate which permits modification of the thrust clearance.

A more specific object of the subject invention is to provide a thrust adjusting mechanism of the hereinbefore described type wherein the adjustable plate is connected to the turbine headcover and is adjusted relative to a shoulder formed on the wicket gate shaft.

Figure 1:
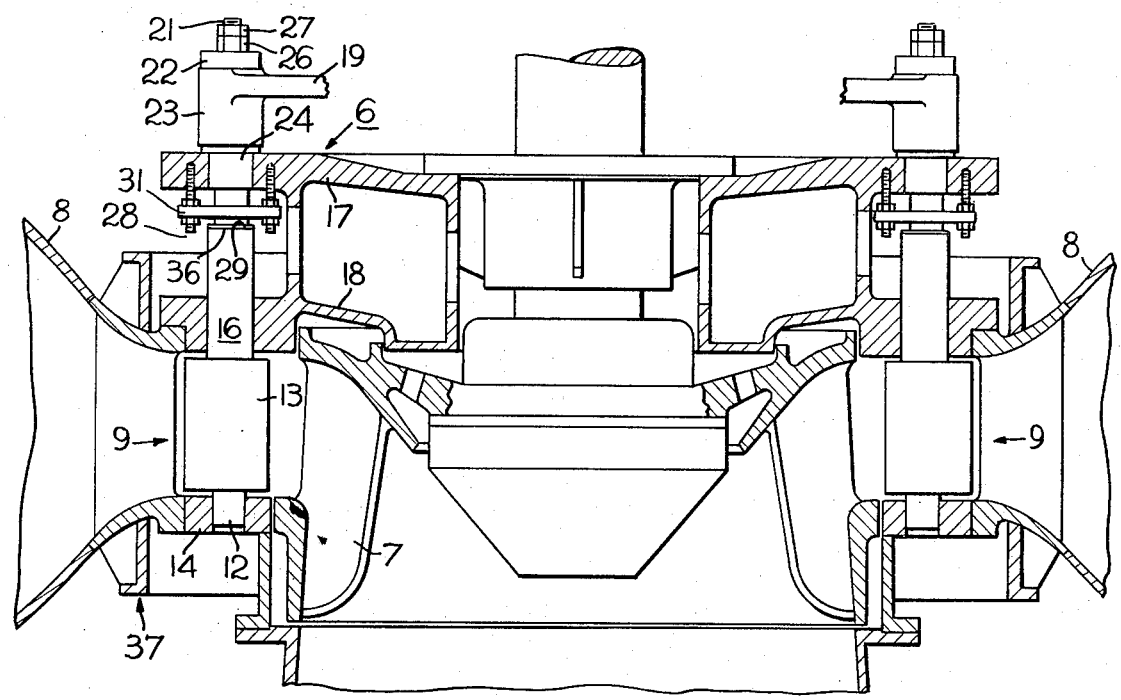
Figure 2:
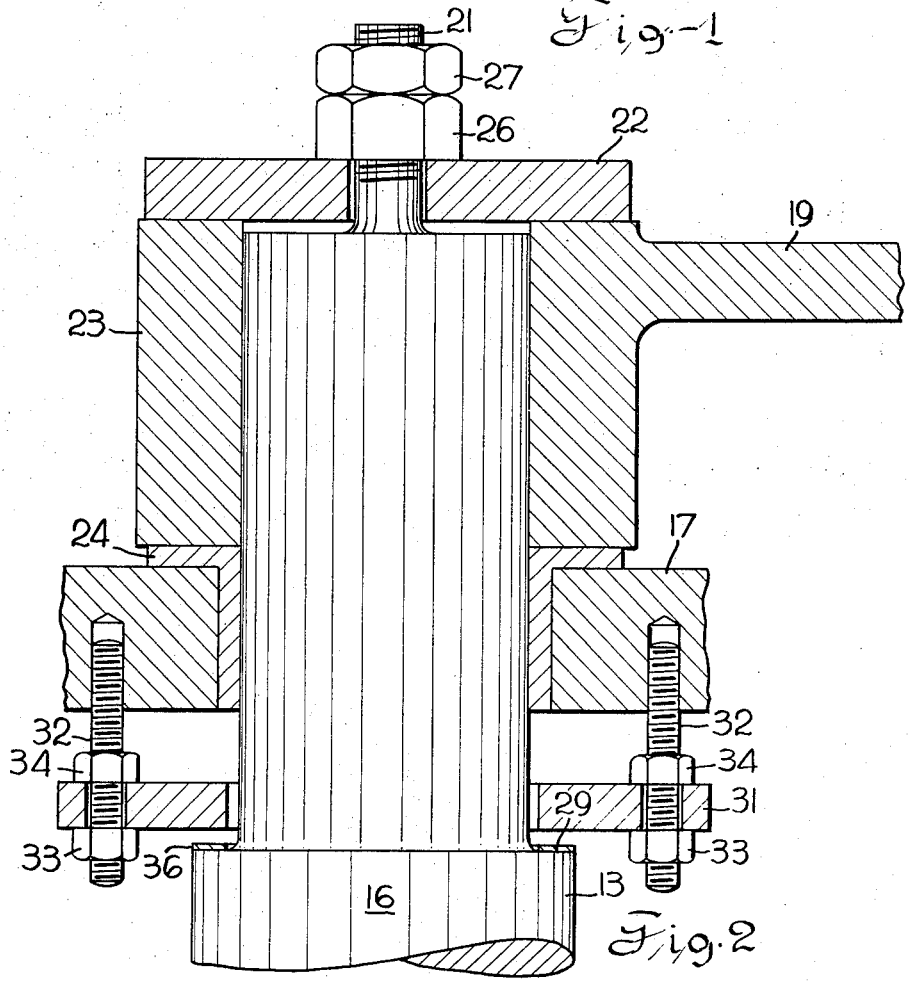

These and other objects of the subject invention will become more fully apparent as the following description is read in light of the attached drawing in which:

FIG. 1 is a sectional view of a portion of a hydraulic turbine showing the wicket gate adjusting mechanism of the subject invention, and FIG. 2 is an enlarged view of the wicket gate adjusting mechanism.

Referring to FIG. 1 there is disclosed a portion of a hydraulic turbine, in this instance a Francis turbine. Broadly, the turbine comprises: a headcover 6 that is stationary and spans the top of the turbine runner 7 and wicket gates 9; a stay ring 37 which is a structural member joining the spiral case 8 with the top and bottom parts of the turbine; a spiral casing 8 (only a portion of which is shown) through which the water stream flows to the runner 7; and a series of wicket gates 9 that control the flow of water from the spiral case to the runner. After passing through the runner 7 the water exits through a draft tube 11.

As shown herein for purposes of illustration, a stub shaft 12 is provided at the lower end of the wicket gate blade 13. This stub shaft 12 may be journaled in a bottom ring 14 connected to the turbine casing 8 through the stay ring 37.

An elongated shaft or stem 16 is connected to the upper end of the gate blade 13. This stem 16 extends through both decks 17 and 18 of the headcover and terminates above the headcover. A control or gate arm generally designated 19 is connected to the portion of the wicket gate extending through and above the headcover 6. As herein shown for purposes of illustration, the stem 16 passes through a bore provided through the end of the control arm 19. Means such as a keyway and key (not shown) are provided to insure movement of the stem 16 with the control arm 19.

Vertical adjustment and support of the wicket gate may be provided in any conventional manner. To this end a threaded stud 21 is provided on the terminal end of the elongated shaft 16. This threaded stud 21 extends through a bore provided in a cap 22. The cap 22 rests on a boss 23 portion of the control arm 19 which encircles the elongated shaft 16. This boss 23 engages a bushing 24 provided in the opening in upper deck 17 of the headcover through which the elongated shaft 16 extends. An adjusting nut 26 and a lock nut 27 are provided on the threaded stud 21. The position of the wicket gate 9 can be adjusted by turning the adjusting nut 26 until the wicket gate blades 13 are properly positioned in the water passageway. The lock nut 27 is then turned into place securely holding the wicket gate adjusting nut. In this position the wicket gate is supported by the headcover 6 through the cap 22, the boss 23 and the bushing 24.

Decks 17 and 18 of the headcover 6 define an annular chamber 28. The elongated shaft 16 of the wicket gates extend through this annular chamber. A shoulder 29 is provided on the elongated shaft 16 and positioned within the chamber 28. A thrust plate 31 having a bore through which the elongated shaft extends is connected to the headcover deck 17 and also located within the chamber 28 adjacent the shoulder 29. This plate 31 is connected to the headcover by means of a plurality of circumferentially spaced threaded studs 32. Nuts 33 and 34 on either side of the thrust plate 31 are threaded onto the stud 32 to hold the thrust plate in adjusted position. A washer 36 of a material such as TEFLON is provided on the shoulder 29 for thrust engagement with the thrust plate 31. By utilizing a washer of TEFLON type or any self-lubricating bearing material lubrication is not necessary.

When installing the wicket gates the axial position is obtained by adjusting nut 26. The thrust plate 31 is then adjusted relative to the washer 36 to provide the proper thrust clearance between the plate and the shoulder. If at a later date additional adjustment of the thrust clearance is necessary, it is a simple matter to adjust the relative position of the plate relative to the thrust shoulder.

The embodiments of the invention, in which an exclusive property or privilege is claimed, are defined as follows:

1. In a hydraulic turbine having a runner covered by the turbine headcover, the improvement comprising: a plurality of wicket gates positioned about said runner and including an elongated shaft extending through said headcover; means engaging said headcover and connected to said elongated shaft to resist axial movement of said gate in one direction; a thrust surface formed on said elongated shaft; a thrust plate positioned adjacent said thrust surface; and means adjustably connecting said thrust plate to said headcover for selective adjustment thereof to obtain the proper thrust clearance between said plate and said surface to resist movement of said gate in the other direction.

* * * * *